Figure 1:
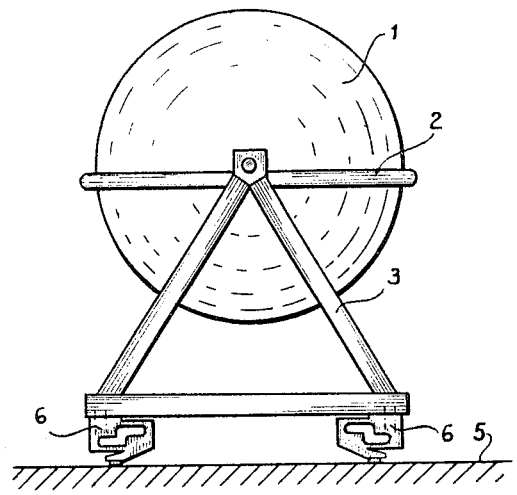

United States Patent [19]

van de Velde

[11] 4,407,160

[45] Oct. 4, 1983

[54] DEVICE FOR DETERMINING THE QUANTITY OF THE CONTENTS OF A TANK MOUNTED IN A FRAME WHICH RESTS ON A BASE WITH FOUR POINTS OF SUPPORT DISPOSED IN THE CORNERS OF A RECTANGLE

[75] Inventor: Reindert van de Velde, Breugel, Netherlands

[73] Assignee: Bavaria B.V., Lieshout, Netherlands

[21] Appl. No.: 250,668

[22] Filed: Apr. 3, 1981

[30] Foreign Application Priority Data

Apr. 3, 1980 [NL] Netherlands ..................... 8001996

[51] Int. Cl.³ .................... G01F 23/20; G01L 1/22
[52] U.S. Cl. .................... 73/296; 73/862.65; 73/862.67; 177/211
[58] Field of Search ........... 73/862.04, 862.65, 862.67, 73/862.54, 296; 338/5; 177/211

[56] References Cited

U.S. PATENT DOCUMENTS

| | | | |
|---|---|---|---|
| 3,072,209 | 1/1963 | Perry, Jr. ..................... | 177/211 X |
| 4,044,920 | 8/1977 | Swartzendruber .......... | 73/862.65 X |
| 4,089,217 | 5/1978 | Rahav et al. ................. | 73/862.65 |
| 4,326,424 | 4/1982 | Koenig .......................... | 73/862.48 |

*Primary Examiner*—Charles A. Ruehl
*Attorney, Agent, or Firm*—Hammond & Littell, Weissenberger and Muserlian

[57] ABSTRACT

Device for determining the quantity of the contents of a tank (1) mounted in a frame (3,4) which rests on a base with four points of support disposed in the corner points of a rectangle, two adjacent points of support being constituted by force measuring elements (6) each consisting of a generally block-shaped body (7) of metal, in which an opening (8) is cut out such that at the lower and upper sides of the body two relatively thin elongated and substantially horizontally extending portions (9,10) are formed which are connected to each other at both ends by thicker material portions disposed at the vertical sides of the body, whereas at the lower side of the body a foot (11) is formed which protrudes from one vertical side towards the vertical axis of the body, and with which the body rests on the base, and the supporting frame (3,4) of the tank is affixed on the upper side of the body near its other vertical side, and two strain gauges (T1,T2) aligned in spaced apart relation with each other in the direction to the vertical axis of the body are adhered to one of the thinner horizontal material portions so that by the deformation of said material portion as a result of the weight of the tank the one strain gauge is under strain of tension and the other under strain of longitudinal compression, the pairs of strain gauges of the two force measuring elements being connected in a resistor bridge to which a read out member is coupled so that a zero deflection and an end scale calibration of the read out member may be obtained.

3 Claims, 4 Drawing Figures

DEVICE FOR DETERMINING THE QUANTITY OF THE CONTENTS OF A TANK MOUNTED IN A FRAME WHICH RESTS ON A BASE WITH FOUR POINTS OF SUPPORT DISPOSED IN THE CORNERS OF A RECTANGLE

The invention relates to a device for determining the quantity of the contents of a tank mounted in a frame which rests on a base with four points of support disposed in the corners of a rectangle.

More specifically, the invention relates to a device for determining the quantity of a liquid, in particular beer, drawn off from the tank through conduits connected to the tank.

Large beer consumers such as bars are more often using spherical storage tanks for beer which are connected to the bar by beer conduits and it is desired to be able to determine the total amount of beer consumed during a meeting or party. However, the use of liquid flow meters is not permitted and glass gauges can not be used.

According to the invention two adjacent points of support of the tank frame are constituted by force measuring elements each consisting of a generally block-shaped body of metal, in which an opening is cut out such that at the lower and upper sides of the body two relatively thin elongated and substantially horizontally extending material portions are formed which are connected to each other at both ends by thicker material portions disposed at the vertical sides of the body, whereas at the lower side of the body a foot is formed which protrudes from one vertical side towards the vertical axis of the body, and with which the body rests on the base, and the supporting frame of the tank is affixed on the upper side of the body near its other vertical side and two strain gauges disposed in spaced apart relation with each other in the direction to the vertical axis of the body are adheared to one of the thinner horizontal material portions so that by the deformation of said material portion as a result of the weight of the tank the one strain gauge is under strain of tension and the other under strain of longitudinal compression, the pairs of strain gauges of the two force measuring elements being connected in a resistor bridge to which a read out member is coupled so that a zero deflection and an end scale calibration of the read out member may be obtained.

Preferably the strain gauges under tension and under longitudinal compression are connected in the two oppositely disposed branches of the resistor bridge, the measuring voltage for the read out member being derived from the connecting points between the strain gauges in the two branches, whilst at the ends of the bridge a supply voltage is supplied which voltage is also applied across two resistance circuits each provided with a potentiometer, in which the slider of the one potentiometer is connected to the connecting point between the strain gauges in one of the branches and can adjust the zero deflection and the slider of the other potentiometer can adjust the end scale deflection.

Advantageously the opening in the body consists of two portions communicating with each other near the vertical axis of the body, the one portion being disposed near the upper side of the body and extends from one vertical side to the vertical axis and the other portion being disposed near the bottom side and extends from the other vertical side to the vertical axis.

Figure 2:
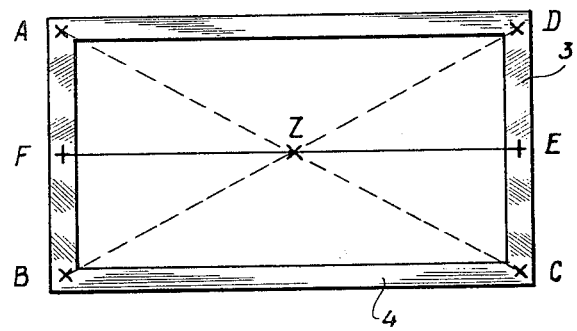
Figure 3:
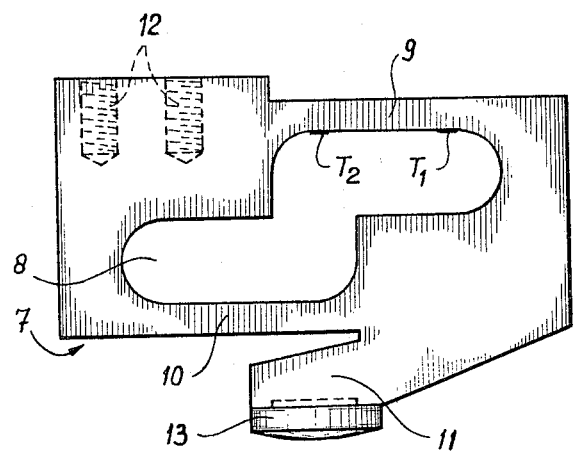
Figure 4:
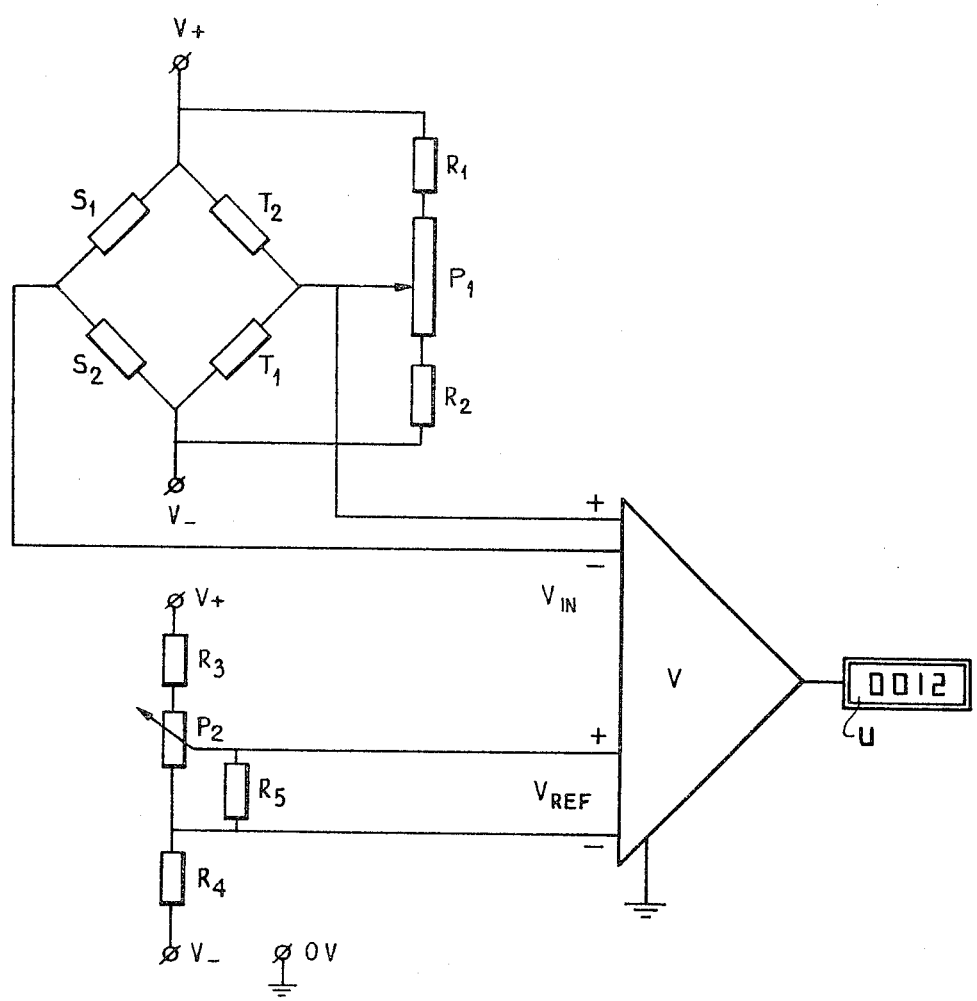

The invention will be explained in more detail while referring to the drawing in which:

FIG. 1 shows in side view a tank provided with a device according to the invention, FIG. 2 shows in top elevation the points of support of the supporting frame of the tank according to FIG. 1, FIG. 3 shows on a large scale a side view of a force measuring element according to the invention, and FIG. 4 illustrates the electric diagram.

As shown in FIG. 1 a spherical tank 1 is mounted pivotable in a supporting frame by means of a suspension ring 2, said supporting frame consisting of two diametrically opposed triangular yokes 3 connected to each other at their lower ends by the rods 4 so that at the bottom side the frame shown in FIG. 2 is formed.

The frame shown in FIG. 2 is supported at the four corner points A, B, C, D by the base 5, the points of support A, B being formed by the force measuring elements 6.

The sum of the vertical forces at the points A, B has a fixed ratio to the total vertical force at the center of gravity Z of the tank including its contents. Said fixed ratio is equal to the ratio between the length Z-E and F-E, the value of said ratio being approximately equal to 0.5. Thereby it is possible to determine the weight of the contents of the tank only by measuring the sum of the vertical forces at the points A,B, which is carried out by the force measuring elements 6.

As shown in FIG. 3 each force measuring element 6 consists of a block-shaped body 7, in which an opening 8 is cut out so that two relatively thin, elongated substantially horizontally extending material portions 9 and 10 are formed which are connected to each other at both ends.

At the underneath side of the body 7 a foot 11 protruding in the direction to the vertical axis is formed, with which the body 7 rests on the base, whereas in the upper side the holes 12 are formed for fastening the supporting frame of the tank. At the foot 11 a cap 13 from plastic material is affixed.

Two strain gauges T1 and T2 are provided at the bottom side of the thin material portion 9. The thin material portions 9 and 10 form two leaf springs constrained at both ends and together form a straight guide so that they are insensitive to side forces. By the forces acting on the body 7 at 11 and 12 the portions 9 and 10 are deformed such that the strain gauge T1 is under longitudinal compression and the strain gauge T2 under tension.

The strain gauges T1 and T2 are connected in the resistor bridge shown in FIG. 4 together with the strain gauges S1 and S2 of the second force measuring element so that the strain gauges S1 and T1 under longitudinal compression and the strain gauges T2 and S2 under tension are oppositely disposed in the two branches of the resistor bridge. To the ends of the bridge the supply voltage V+, V−, amounting +5 V and −5 V for example, is applied, while from the connecting points between the strain gauges S1, S2 and T2, T1 respectively the measuring voltage $V_{IN}$ is derived which is supplied to the electronic direct current ratiometer V with the read-out member U.

The supply voltage V+, V− is also applied across the resistance circuit R1, R2 with the potentiometer P1, in which the slider of the potentiometer P1 is connected to the connecting point between the strain gauges T2, T1. Further the supply voltage V+, V− is connected across the resistance circuits R3, R4 with the potentiometer P2, by which a reference signal $V_{REF}$ is obtained which is also supplied to the direct current ratiometer V.

For example, the strain gauges have a resistance of 100 Ohm, whereas the resistors R1 and R2 have a resistance of 22 K/Ohms and the potentiometer P1 is a ten stroke potentiometer having a resistance of 50 K/Ohms. The resistors R3, R4 and R5 may have a resistance of 27 K/Ohms 39 K/Ohms and 150 Ohm respectively, whereas the potentiometer P2 is a ten stroke potentiometer of 25 K/Ohms.

For the calibration first the estimated value for $V_{REF}$ with a tank totally filled up is set by means of the potentiometer P2, whereafter by means of the potentiometer P1 the zero deflection of the read-out member U with an empty tank is set. Thereafter the tank is entirely filled up with for example 1000 liters of beer and by means of the potentiometer P2 the desired end of scale deflection of the read-out member U is set.

What is claimed is:

1. Device for determining the quantity of the contents of a tank mounted in a frame which rests on a base with four points of support disposed in the corner points of a rectangle, characterized in that two adjacent points of support of the tank frame are constituted by force measuring elements, each consisting of a generally block-shaped body of metal, in which an opening is cut out such that at the lower and upper side of the body two relatively thin elongated and substantially horizontally extending material portions are formed which are connected to each other at both ends by thicker material portions disposed at the vertical sides of the body, whereas at the lower side of the body a foot is formed which protrudes from one vertical side towards the vertical axis of the body, and with which the body rests on the base, and the supporting frame of the tank is affixed on the upper side of the body near its other vertical side and two strain gauges aligned in spaced apart relation with each other in the direction to the vertical axis of the body are adheared to one of the thin horizontal material portions so that by the deformation of said material portion as a result of the weight of the tank the one strain gauge is under strain of tension and the other under strain of longitudinal compression, the pairs of strain gauges of the two force measuring elements being connected in a resistor bridge to which a read out member is coupled by means to obtain a zero deflection and an end scale calibration of the read out member.

2. Device according to claim 1 characterized in that the resistor bridge comprises two branches, the strain gauges under tension being oppositely disposed in the two branches and the strain gauges under longitudinal compression being oppositely disposed in the two branches, the measuring voltage for the read out member being derived from the connecting points between the strain gauges in the two branches, said means to obtain a zero deflection and an end scale calibration comprising two resistance circuits each provided with a potentiometer, a supply voltage is supplied to opposite ends of the resistor bridge which voltage is also applied across said two resistance circuits, the slider of one potentiometer being connected to the one connecting point between the strain gauges in one of the branches to adjust the zero deflection and the slider of the other potentiometer enabling adjustment of the end scale calibration of the read out member.

3. Device according to claim 1 or 2, characterized in that the opening in the body consists of two portions communicating with each other near the center of the body, one portion being disposed near the upper side of the body and extends from one vertical side to the center and the other portion being disposed near the bottom side and extends from the other vertical side to the center.

* * * * *